United States Patent
Tiwari et al.

(10) Patent No.: US 11,539,542 B2
(45) Date of Patent: Dec. 27, 2022

(54) CONTENT CAPTURE DURING VIRTUAL MEETING DISCONNECT

(71) Applicant: Citrix Systems, Inc., Fort Lauderdale, FL (US)

(72) Inventors: Ayush Tiwari, Arga (IN); Arnav Akhoury, Jamshedpur (IN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 17/190,820

(22) Filed: Mar. 3, 2021

(65) Prior Publication Data

US 2022/0286312 A1 Sep. 8, 2022

(51) Int. Cl.
*H04L 12/18* (2006.01)
*H04N 7/15* (2006.01)
*H04N 21/4788* (2011.01)

(52) U.S. Cl.
CPC ...... *H04L 12/1831* (2013.01); *H04L 12/1822* (2013.01); *H04N 7/15* (2013.01); *H04N 7/155* (2013.01); *H04N 21/4788* (2013.01)

(58) Field of Classification Search
CPC ...... H04N 7/15; H04N 7/155; H04N 21/4788; H04N 21/4396; H04N 21/4781; H04N 21/6587; H04L 12/1831; H04L 12/1822; H04L 12/18; H04L 65/1083; G06Q 30/0269; H04M 3/56; G10L 15/22; G06F 16/3329
See application file for complete search history.

(56) References Cited

U.S. PATENT DOCUMENTS

| | | | | |
|---|---|---|---|---|
| 10,573,312 | B1* | 2/2020 | Thomson | G10L 15/22 |
| 2004/0081136 | A1* | 4/2004 | Brown | H04L 12/1831 370/352 |
| 2004/0203677 | A1* | 10/2004 | Brown | H04M 3/56 455/416 |
| 2005/0233736 | A1* | 10/2005 | Berstis | H04L 12/1831 455/416 |
| 2008/0013708 | A1* | 1/2008 | Brown | H04L 12/1831 379/202.01 |
| 2008/0077867 | A1* | 3/2008 | Hake | H04N 21/4781 715/730 |
| 2010/0316207 | A1* | 12/2010 | Brunson | H04M 3/56 379/202.01 |
| 2011/0267987 | A1* | 11/2011 | Asthana | H04L 12/18 370/260 |
| 2015/0296247 | A1* | 10/2015 | Glasser | H04N 21/6587 725/74 |
| 2017/0208105 | A1* | 7/2017 | Katekar | H04L 65/1083 |
| 2018/0032997 | A1* | 2/2018 | Gordon | G06Q 30/0269 |
| 2019/0189117 | A1* | 6/2019 | Kumar | G06F 16/3329 |
| 2020/0097095 | A1* | 3/2020 | Sirpal | H04N 21/4396 |

* cited by examiner

*Primary Examiner* — Le H Luu
(74) *Attorney, Agent, or Firm* — Hoffman Warnick LLC (57) ABSTRACT

A system and method for capturing missed content during a virtual meeting disconnect. A method is disclosed that includes: outputting a live stream of the virtual meeting to each of a set of client devices; detecting a disconnect between the virtual meeting and a first client; initiating a recording of the virtual meeting in response to the disconnect; and outputting a catch-up viewing option to a user of the first client in response to a reconnect with the first client, wherein the catch-up viewing option streams the recording to the first client at an accelerated speed in place of the live stream until the recording catches up to the live stream.

11 Claims, 8 Drawing Sheets

| User | Disconnect Period 1 | Disconnect Period 2 | Disconnect Period 3 |
|---|---|---|---|
| User A | 05:10 – 05:13 | 09:12 – Timer Expired | ... |
| User B | 01:12 – 01:13 | 04:45 – 04:59 | 09:01 – 09:15 |
| ... | ... | ... | ... |
| ... | ... | ... | ... |
| ... | | | |

CONTENT CAPTURE DURING VIRTUAL MEETING DISCONNECT

BACKGROUND OF THE DISCLOSURE

Virtual meetings have become a mainstream tool for businesses, schools, government services, and other entities. Services such as GotoMeeting, Zoom, Google Hangouts, etc., provide easy to use online platforms that allow groups of users located around the world to meet in a virtual setting and live stream video, audio, visual content, etc., via a client device such as a phone, desktop computer, laptop, tablet, etc. Unfortunately, it is not uncommon for users to get disconnected from a virtual meeting and have to reconnect. These disconnections can be attributed to inconsistent Internet connection, too much load on the network traffic, power outages, etc.

When a user disconnects and then reconnects, the user may miss important information being discussed in the meeting. In some cases, others in the meeting may have to summarize what was missed in order to bring the user up to speed or the user has to surmise what they missed when disconnected. Furthermore, frequent disconnections disrupt the flow of the virtual meeting, which may result in loss of productivity for the entire group.

BRIEF DESCRIPTION OF THE DISCLOSURE

Aspects of this disclosure include a system and method that detects when a user is disconnected from a virtual meeting and provides a set of options for the user to recapture lost information from the meeting without interrupting others.

A first aspect of the disclosure provides a system that includes a memory and a processor coupled to the memory and configured to implement a virtual meeting for a set of client devices according to a process. The process includes: outputting a live stream of the virtual meeting to each of the client devices; detecting a disconnect between the virtual meeting and a first client device; initiating a recording of the virtual meeting in response to the disconnect; and outputting a catch-up viewing option to a user of the first client device in response to a reconnect with the first client device, wherein the catch-up viewing option streams the recording to the first client device at an accelerated speed in place of the live stream until the recording catches up to the live stream.

A second aspect of the disclosure provides a method for implementing a virtual meeting at a server for a set of client devices. The method includes: outputting a live stream of the virtual meeting to each of the client devices; detecting a disconnect between the virtual meeting and a first client device; initiating a recording of the virtual meeting in response to the disconnect; and outputting a catch-up viewing option to a user of the first client in response to a reconnect, wherein the catch-up viewing option streams the recording at an accelerated speed in place of the live stream until the recording catches up to the live stream.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

The drawings are intended to depict only typical aspects of the disclosure, and therefore should not be considered as limiting the scope of the disclosure.

DETAILED DESCRIPTION OF THE DISCLOSURE

Embodiments of the disclosure provide technical solutions for handling disconnects that occur during a virtual meeting. In illustrative embodiments, options are presented to the disconnected user to recapture lost content from the meeting without interrupting others.

Figure 1:
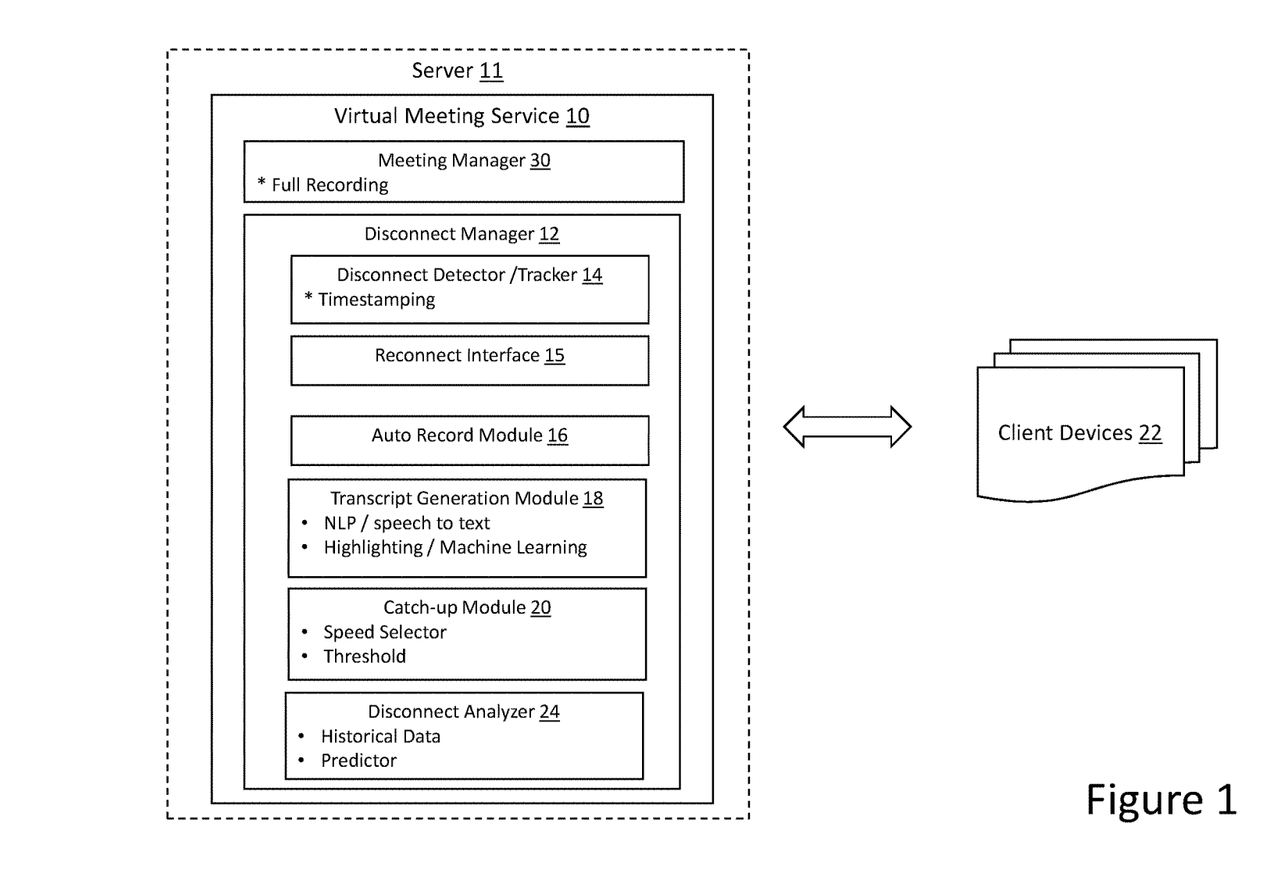
FIG. 1 depicts a virtual meeting service accessible by a set of client devices, in accordance with an illustrative embodiment.

FIG. 1 depicts an illustrative virtual meeting service 10 implemented on a server 11, which is accessible by users via a set of client devices 22, such as desktop computers, laptops, tablets, phones, etc. Virtual meeting service 10 may comprise any online service that allows groups of users to meet in a virtual setting and live stream shared video, audio, and content amongst the group. In this embodiment, a meeting manager 30 is provided to orchestrate meetings for different groups of users. Among other responsibilities, the meeting manager 30 tracks which users/devices 22 are connected to which meeting.

Also provided by service 10 is a disconnect manager 12 for handling situations where a client device 22 (and associated user) is disconnected from an active meeting. Disconnect manager 12 generally includes a disconnect detector/tracker 14 that detects when a user operating a client device 22 becomes disconnected and tracks relevant information associated with the disconnect, (e.g., a client id, user id, time of disconnection and reconnection, etc.), as well as a reconnect interface 15 for presenting the user with options for recapturing missed content. In some embodiments, disconnect detector/tracker 14 collects timestamps of disconnect and reconnect details in a table or the like that can be inserted into a recording to facilitate tracking and searching of missed content.

In this embodiment, various modules are provided to facilitate recapturing of content missed during a disconnection period, and include: (1) an auto record module 16 that automatically begins recording content from a virtual meeting in response to a detected disconnect; (2) a transcript generation module 18 that generates a transcript of audio captured during the disconnection period; and (3) a catch-up module 20 that allows a user to play recorded content at an accelerated speed until the recorded content catches up (i.e., is synchronized) with the actual live stream. In some cases, the meeting manager 30 may be configured, e.g., by a user, to record the entire meeting, which alleviates the need activate the auto record module 16 when a disconnect is detected.

Transcript generation module 18 may use speech to text processing, or any other process to generate a transcript from the recorded content. In some embodiments, module 18 may highlight relevant sections of the transcript based on an analysis of the content, e.g., using natural language processing (NLP), machine learning (ML) or other techniques. For example, machine learning can evaluate a context of the virtual meeting and identify passages that match the context. In this case, certain words, names or detected emphasis uttered by one or more participants may be identified by a machine learning routine as relevant passages and be highlighted in the transcript (e.g., with a visual marker, an annotation, a timestamp, etc.).

Catch-up module 20 allows a user, upon a reconnect, to replay the missed part of the meeting at an accelerated pace. In this case, the recorded content, including any recorded audio, video, and shared content items are played on the user's client device 22 at a faster speed than normal in place of the live stream until the recorded content catches up with the live stream. Service 10 will suppress the live stream being sent to the user during this time, and the auto record module 16 (if activated) will continue to record content until the point in time that the user catches up (i.e., synchronizes) with the live stream of the meeting.

In one embodiment, the user can select the playback speed via the user interface 15. In the event the user missed too much of the meeting as determined by a threshold value (e.g., 20 minutes), the catch-up option may not be presented to the user. Instead, the user may select another option such as receiving the recording at a later time or viewing the transcript during or after the meeting. In the case where the user is able to view the recording using catch-up module 20, the server may delete the recording once the user catches up in order to save memory.

One or more proposed playback speeds may be offered to the user, e.g., based on the amount of missed content. For example, based on the length of the disconnect period, module 20 can calculate and inform the user how long it will take to catch up with the live stream at different playback speeds. For instance, if the disconnect period was determined as length t1, then at a playback speed of 2×, the user will catch up to the live stream at 2*t1; for a playback speed of 1.5×, the user would catch up at approximately 3*t1, etc. Thus, if five minutes were missed, the user could be presented with a 2× playback option to rejoin in 10 minutes, or a 1.5× playback option to rejoin in 15 minutes. In other embodiments, the user may be presented with playback controls that allows the user to vary the playback speed, speeding up or skipping over unimportant parts, and slowing down during important parts.

In certain embodiments, disconnect manager 12 may also include a disconnect analyzer 24 that analyzes historical disconnection data (e.g., number of times a user/client device 22 disconnected in the past, length of the previous disconnection periods, user profiles, etc.) and predicts, e.g., how long a currently detected disconnection will last, whether the user will likely reconnect, how long the meeting will likely last, etc. These predictions can then be used to manage current disconnections by, e.g., setting the catch-up threshold value, determining whether to continue recording, etc.

Figure 2:
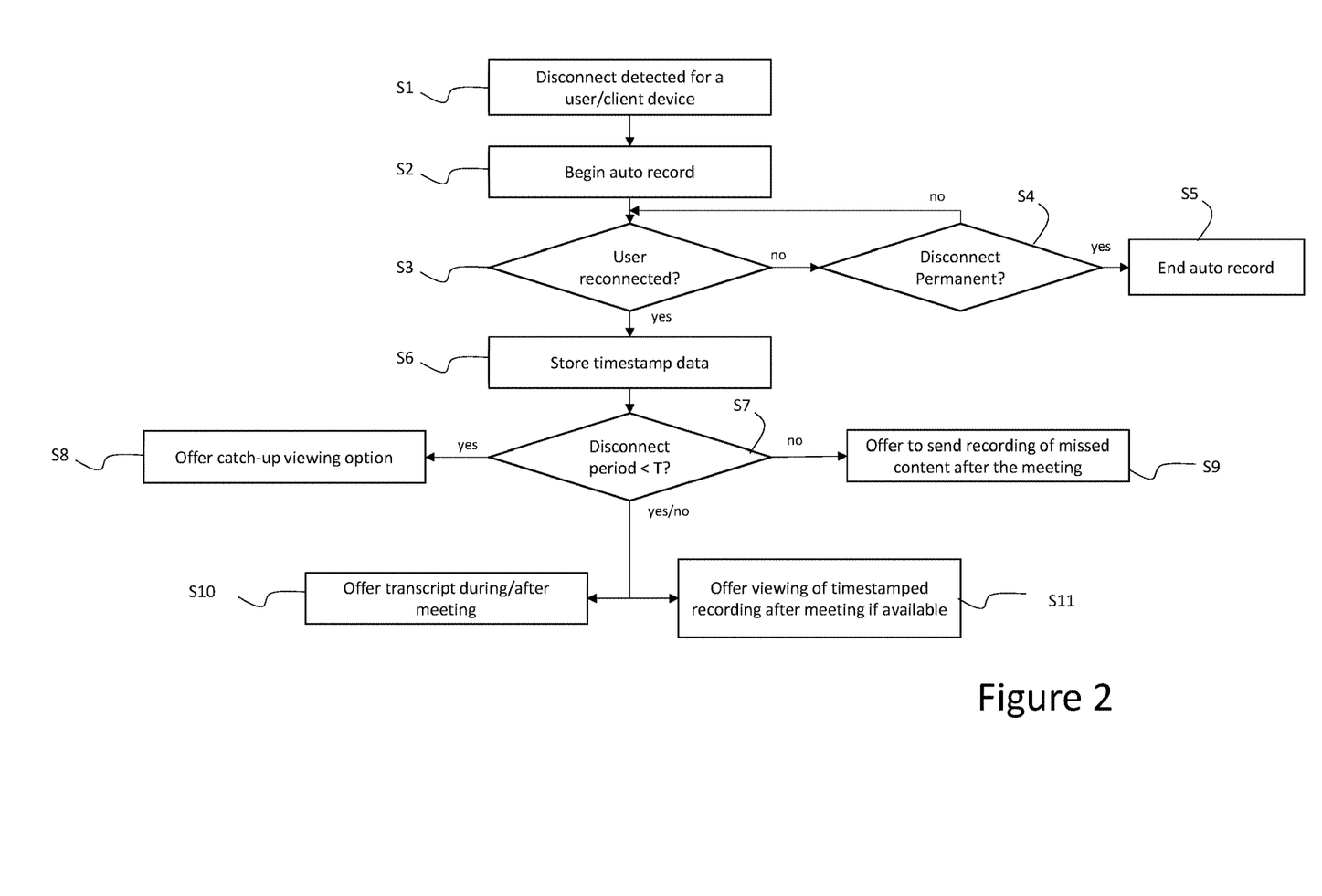
FIG. 2 depicts a flow diagram of method for handling disconnects, in accordance with an illustrative embodiment.

FIG. 2 depicts a flow diagram of an illustrative process utilizing disconnect manager 12 (FIG. 1). At S1, a disconnect is detected for a user/client device 22 within an active meeting and at S2, the live stream of the meeting begins to automatically record in response to the disconnection. At S3, a check is made to determine if the user/client device 22 has reconnected to the meeting. If no at S3, then a determination is made whether the disconnect is permanent at S4, e.g., using disconnect analyzer 24. Using historical data, analyzer 24 can, e.g., evaluate historical information such as the average and the maximum time that it takes a user to re-connect after disconnecting. Using this data, the analyzer 24 can predict a point in time at which the user is not expected to rejoin. For example, in a simple approach, if it known that the average disconnect time is two minutes and the maximum disconnect period is 15 minutes, and the current disconnect time is 16 minutes, a permanent disconnect can be presumed at S4, and the disconnect manager 12 can simply stop the recording. In a more aggressive approach, a disconnect time of greater than the average but less than the maximum could be used to establish a permanent disconnect at S4, e.g., based on a statistical analysis. For instance, for the same average and maximum as above, a disconnect time of 10 minutes could trigger a permanent disconnect if the likelihood of a reconnect after 10 minutes is determined to be less than 10%. The system can also intelligently predict if a user is expected to be permanently disconnected by using the ping latency that the user is experiencing. For example, if a disconnected user was experiencing a ping latency over 200 ms while they were connected, it may be presumed that the network is unstable for the user and the disconnect is likely permanent. If a permanent disconnect is not determined at S4, then the process repeatedly checks for a reconnect at S3.

If a reconnect is detected at S3, then timestamp data of the disconnect period is saved at S6, and a determination is made at S7 whether the disconnect period is less than a threshold T. If yes at S7, then the user is offered a catch-up viewing option at S8. Threshold T can be for example be set by an administrator or calculated dynamically based on a predicted amount of time remaining $T_R$ in the meeting. For example, T could be dynamically calculated as $T=0.33*T_R$, essentially requiring that the disconnect period be ⅓ or less of the predicted time remaining in the meeting. If a user remains disconnected for longer than the threshold T (no at S7), then they will not be given the catch-up viewing option, but instead be offered other options, e.g., to receive a recording of missed content or entire meeting after the meeting at S9, e.g., via a link in an email message.

In either case (yes or no at S7), a transcript of the missed content can be offered to the user either for viewing during the meeting or after at S10. As noted, the transcript may be highlighted (e.g., annotated, marked up, timestamped, etc.) based on, e.g., an NLP analysis of the content. Additionally, the user can be offered a timestamped recording of the entire meeting (in the case the entire meeting was being recorded) to view after the meeting at S11.

In order to reduce the load on the server 11 (FIG. 1), it may not be necessary to record individual streams for each disconnected user in a meeting. For example, if user A is disconnected from 09:10 to 09:13 and user B is disconnected from 09:09 to 09:10, then a single recording from 09:09 to 09:13 can be made by auto record module 16 and parceled as necessary to the appropriate user based on timestamped disconnect periods for both. For instance, by the time user A gets disconnected, the module 16 would have already started recording for user B. Instead of starting a new recording for A, module 16 will simply note the time at which A got disconnected. When B rejoins, module 16 will not stop the recording as it still expects user A to reconnect. The recording will stop either when the user A rejoins, and no other user is disconnected or when a permanent disconnect is detected (e.g., a time limit expires), and user A is not expected to re-join.

Figure 3:
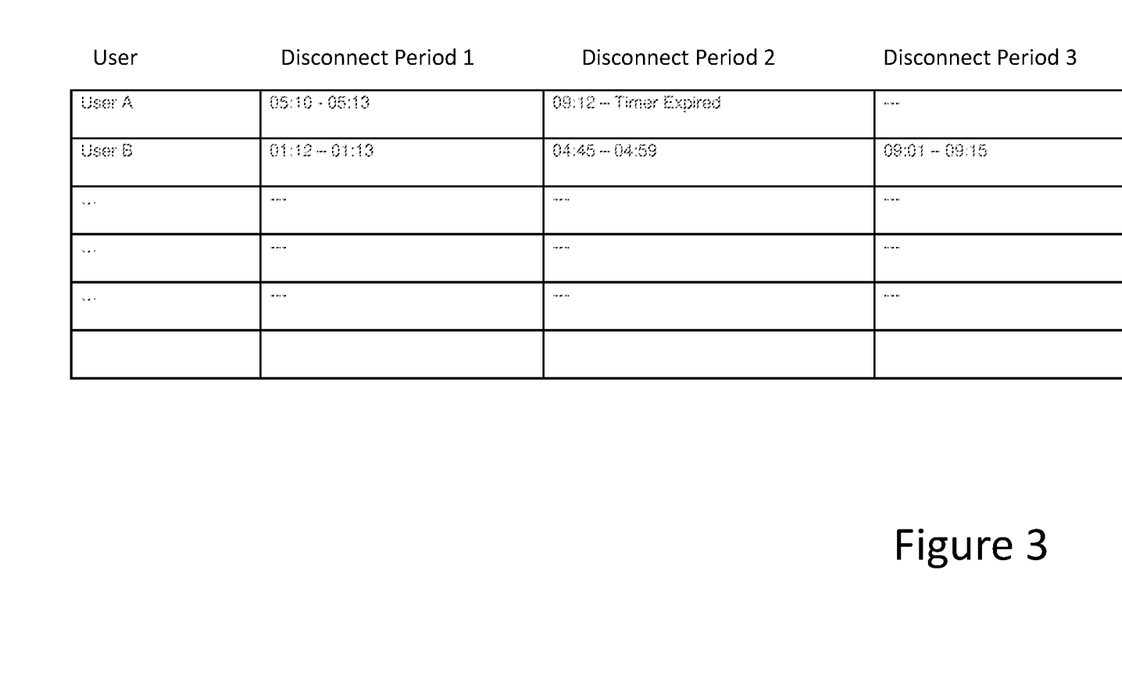
FIG. 3 depicts a table of disconnect timestamps, in accordance with an illustrative embodiment.

In order to keep a track of disconnected users, disconnect manager 12 can utilize a simple table and store the time at which a particular user gets disconnected and when they rejoin. An illustrative table is shown in FIG. 3 that track each user who gets disconnected. As shown, the manager 12 will store timestamps of each disconnect period. If a timer expires, i.e., a threshold disconnection time is exceeded, the user is assumed to have left for good and will not be expected to rejoin, and will not see options upon reconnection. As noted, these stored timestamp values can be used to parcel a recording for multiple users; in a full recording to allow the user to skip to their own missed content; in a full transcript to show a user where they missed content, etc.

Note that if a full recording of meeting is being made for the general audience, then the implementation involving the catch-up mode becomes even simpler, in that the auto record module 16 need not be activated. Instead, the timestamps will be used to identify the parts of the full recording that can be used during catch-up mode for the user.

Figure 4:
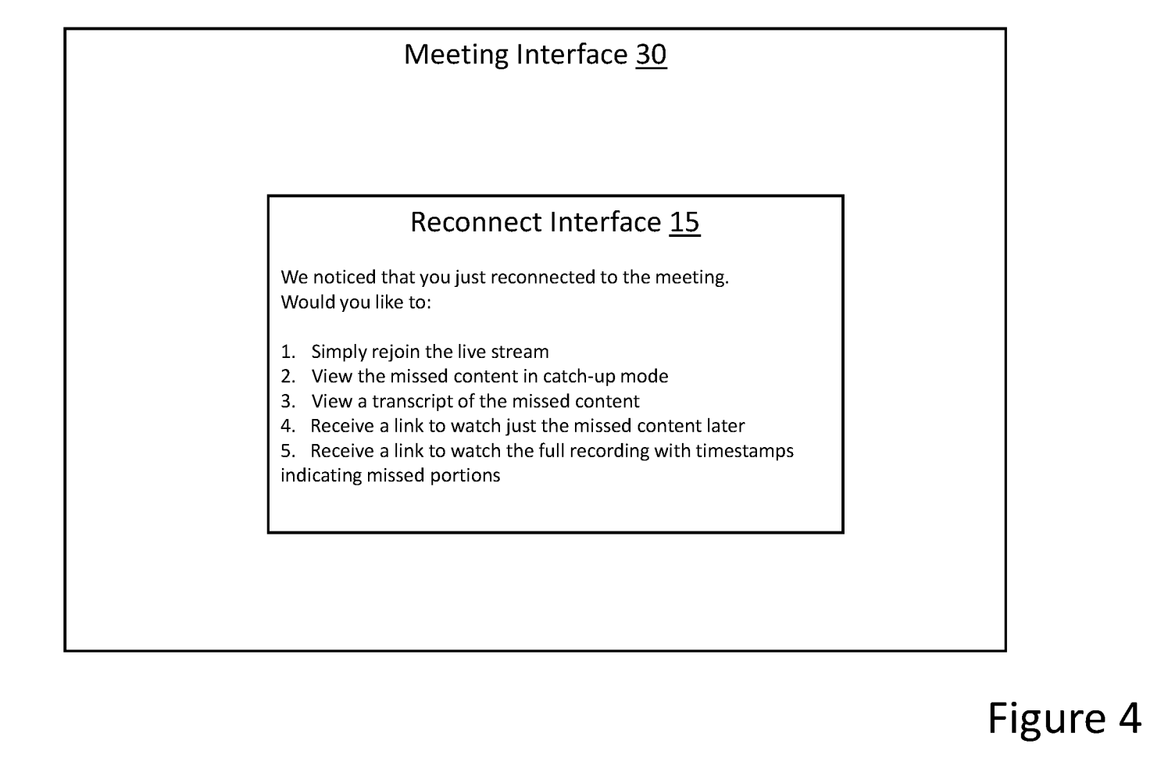
FIG. 4 depicts a reconnect interface displayed within a client device, in accordance with an illustrative embodiment.
Figure 5:
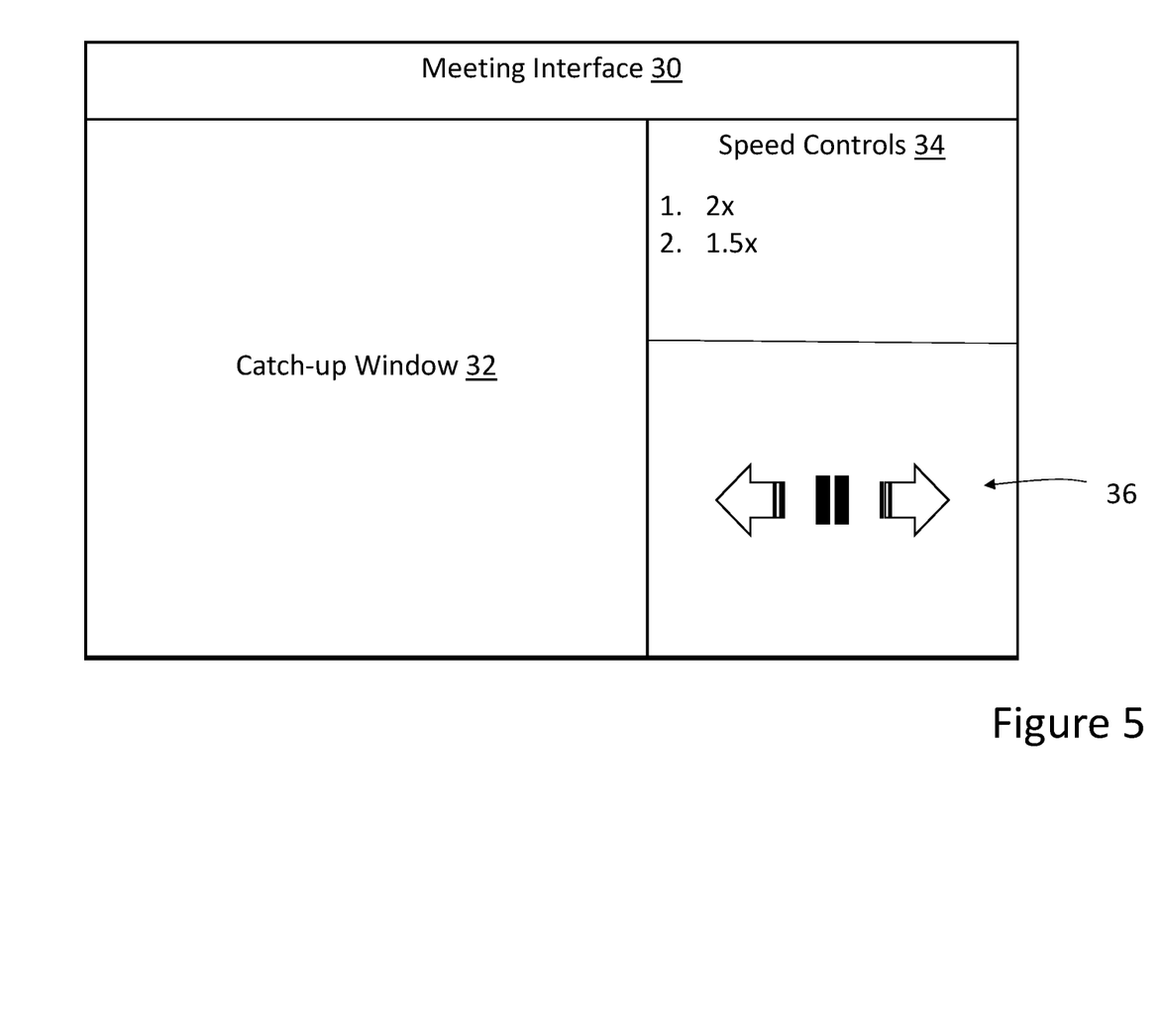
FIG. 5 depicts a catch-up window and speed controls displayed within a client device, in accordance with an illustrative embodiment.

FIG. 4 depicts an illustrative meeting interface 30 for displaying the live stream to a user on a client device 22. Also shown is an illustrative reconnect interface 15 that is displayed upon reconnection. In this case, the user is presented with five options including the option to simply rejoin the live stream and essentially ignore any missed content. Additionally, the user is presented with the option to view the missed content in catch-up mode. If the user selects this option, the user may also be given the option to select or manually control the speed, and the accelerated content will appear in the meeting interface 30 at the selected speed. An example of this is shown in FIG. 5 in which the meeting interface 30 includes a catch-up window 32 for displaying missed content at an accelerated speed, and a set of speed controls 34 that allows the user to select a speed (e.g., 2×, 1.5×) and/or use manual controls to manipulate the speed.

Figure 6:
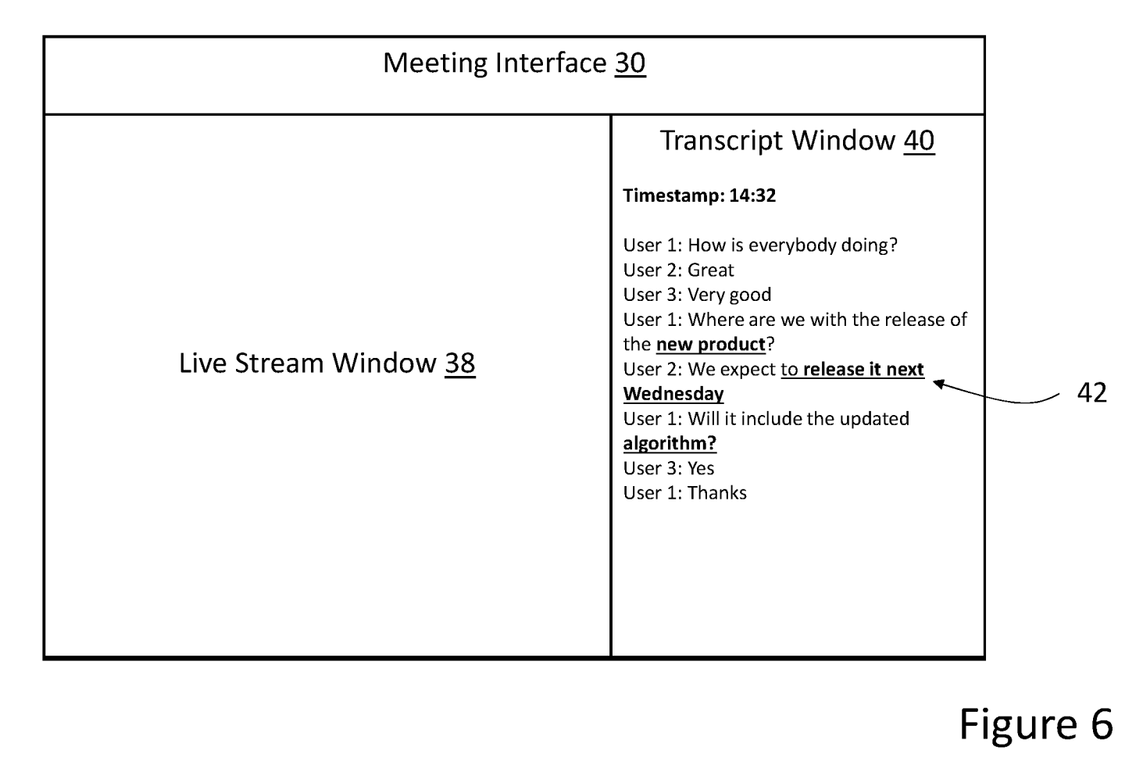
FIG. 6 depicts a live stream window and transcript window displayed within a client device, in accordance with an illustrative embodiment.

Further, as shown in FIG. 4, the user can select the option to view a transcript of the missed content. An example of this is shown in FIG. 6, in which a transcript window 40 displaying the missed content transcript is shown along with a live stream window 38 that displays the actual live meeting. In the example shown, the transcript includes timestamp information as well as highlighted passages 42 that indicate important content.

Still further in FIG. 4, the user can select the select the option to receive a link, e.g., via a chat message, email, etc., to view the missed content at a later time. Finally, in the event that the entire meeting is being recorded, the user could select the option watch the full recording with timestamps indicating missed portions.

Figure 7:
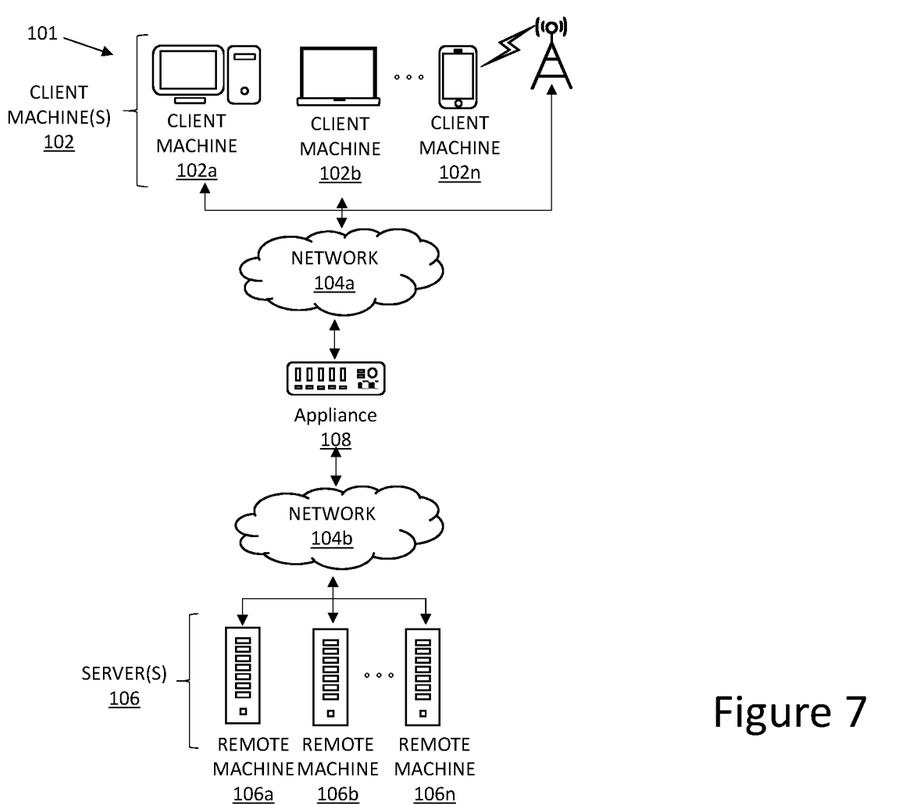
FIG. 7 depicts a network infrastructure, in accordance with an illustrative embodiment.

Referring to FIG. 7, a non-limiting network environment 101 in which various aspects of the disclosure may be implemented includes one or more client machines (or "devices") 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 8:
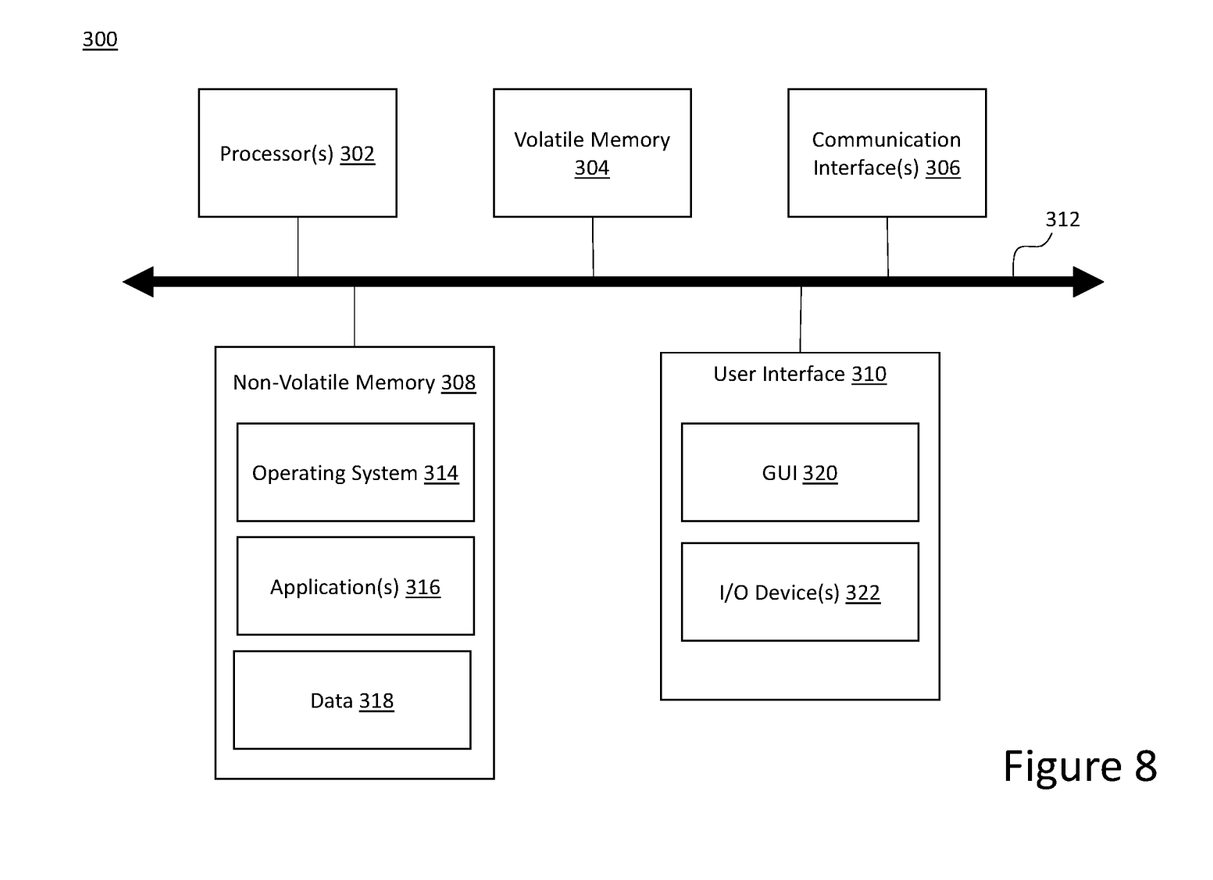
FIG. 8 depicts a computing system, in accordance with an illustrative embodiment.

Elements of the described solution may be embodied in a computing system, such as that shown in FIG. 8 in which a computing device 300 may include one or more processors 302, volatile memory 304 (e.g., RAM), non-volatile memory 308 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 310, one or more communications interfaces 306, and communication bus 312. User interface 310 may include graphical user interface (GUI) 320 (e.g., a touchscreen, a display, etc.) and one or more input/output (I/O) devices 322 (e.g., a mouse, a keyboard, etc.). Non-volatile memory 308 stores operating system 314, one or more applications 316, and data 318 such that, for example, computer instructions of operating system 314 and/or applications 316 are executed by processor(s) 302 out of volatile memory 304. Data may be entered using an input device of GUI 320 or received from I/O device(s) 322. Various elements of computer 300 may communicate via communication bus 312. Computer 300 as shown in FIG. 8 is shown merely as an example, as clients, servers and/or appliances and may be implemented by any computing or processing environment and with any type of machine or set of machines that may have suitable hardware and/or software capable of operating as described herein.

Processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 306 may include one or more interfaces to enable computer 300 to access a computer network such as a LAN, a WAN, or the Internet through a variety of wired and/or wireless or cellular connections.

In described embodiments, a first computing device 300 may execute an application on behalf of a user of a client computing device (e.g., a client), may execute a virtual machine, which provides an execution session within which applications execute on behalf of a user or a client computing device (e.g., a client), such as a hosted desktop session, may execute a terminal services session to provide a hosted desktop environment, or may provide access to a computing environment including one or more of: one or more applications, one or more desktop applications, and one or more desktop sessions in which one or more applications may execute.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The invention claimed is:

1. A system, comprising:
a memory; and
a processor coupled to the memory and configured to implement a virtual meeting for a set of client devices according to a process that includes:
outputting a live stream of the virtual meeting to each of the client devices; detecting a disconnect between the virtual meeting and a first client device;
initiating a recording of the virtual meeting in response to the disconnect;
outputting a catch-up viewing option to a user of the first client device in response to a reconnect with the first client device, wherein the catch-up viewing option streams the recording to the first client device at an accelerated speed in place of the live stream until the recording catches up to the live stream;
prior to outputting the catch-up viewing option, determining if a disconnect period between the disconnect and reconnect is greater than a threshold and in response to the disconnect period being greater than the threshold, sending the recording to the user after the virtual meeting in place of outputting the catch-up viewing option;
generating a transcript of the recording during a disconnect period;
analyzing the transcript to identify relevant portions, wherein analyzing uses machine learning to evaluate a context of the virtual meeting and identify passages that match the context;
displaying the transcript with the relevant portions highlighted at the first client device during the virtual meeting; and
terminating and deleting the recording after the recording catches up to the live stream.

2. The system of claim 1, wherein a rate of the accelerated speed is selected by the user.

3. The system of claim 1, wherein the process further includes storing timestamp information of disconnect periods for each of the client devices.

4. The system of claim 3, wherein the process further includes:
streaming a recording of the virtual meeting to at least one client device that experienced a disconnect; and
including timestamp information in the recording indicating where the at least one client device experienced the disconnect.

5. The system of claim 3, wherein the process further includes:

providing a transcript of the virtual meeting to at least one client device that experienced a disconnect; and
including timestamp information in the transcript indicating where the at least one client device experienced the disconnect.

6. A method for implementing a virtual meeting at a server for a set of client devices, comprising:
outputting a live stream of the virtual meeting to each of the client devices;
detecting a disconnect between the virtual meeting and a first client device;
initiating a recording of the virtual meeting in response to the disconnect;
outputting a catch-up viewing option to a user of the first client in response to a reconnect, wherein the catch-up viewing option streams the recording at an accelerated speed in place of the live stream until the recording catches up to the live stream;
prior to outputting the catch-up viewing option, determining if a disconnect period between the disconnect and reconnect is greater than a threshold and in response to the disconnect period being greater than the threshold, sending the recording to the user after the virtual meeting in place of outputting the catch-up viewing option;
generating a transcript of the recording during a disconnect period;
analyzing the transcript to identify relevant portions, wherein analyzing uses machine learning to evaluate a context of the virtual meeting and identify passages that match the context;
displaying the transcript with the relevant portions highlighted at the first client device during the virtual meeting; and
terminating and deleting the recording after the recording catches up to the live stream.

7. The method of claim 6, wherein a rate of the accelerated speed is selected by the user.

8. The method of claim 6, further comprising:
determining if the disconnect is permanent; and
in response to determining that the disconnect is permanent, terminating the recording.

9. The method of claim 6, further comprising storing timestamp information of disconnect periods for each of the client devices.

10. The method of claim 9, further comprising:
streaming a recording of the virtual meeting to at least one client device that experienced a disconnect; and
including timestamp information in the recording indicating where the at least one client device experienced the disconnect.

11. The method of claim 9, further comprising:
providing a transcript of the virtual meeting to at least one client device that experienced a disconnect; and
including timestamp information in the transcript indicating where the at least one client device experienced the disconnect.

* * * * *